A. SHANNON.
APPARATUS FOR MAKING COATINGS OF LIQUID OR ATOMIZED SUBSTANCES.
APPLICATION FILED SEPT. 23, 1919.
1,357,908. Patented Nov. 2, 1920.
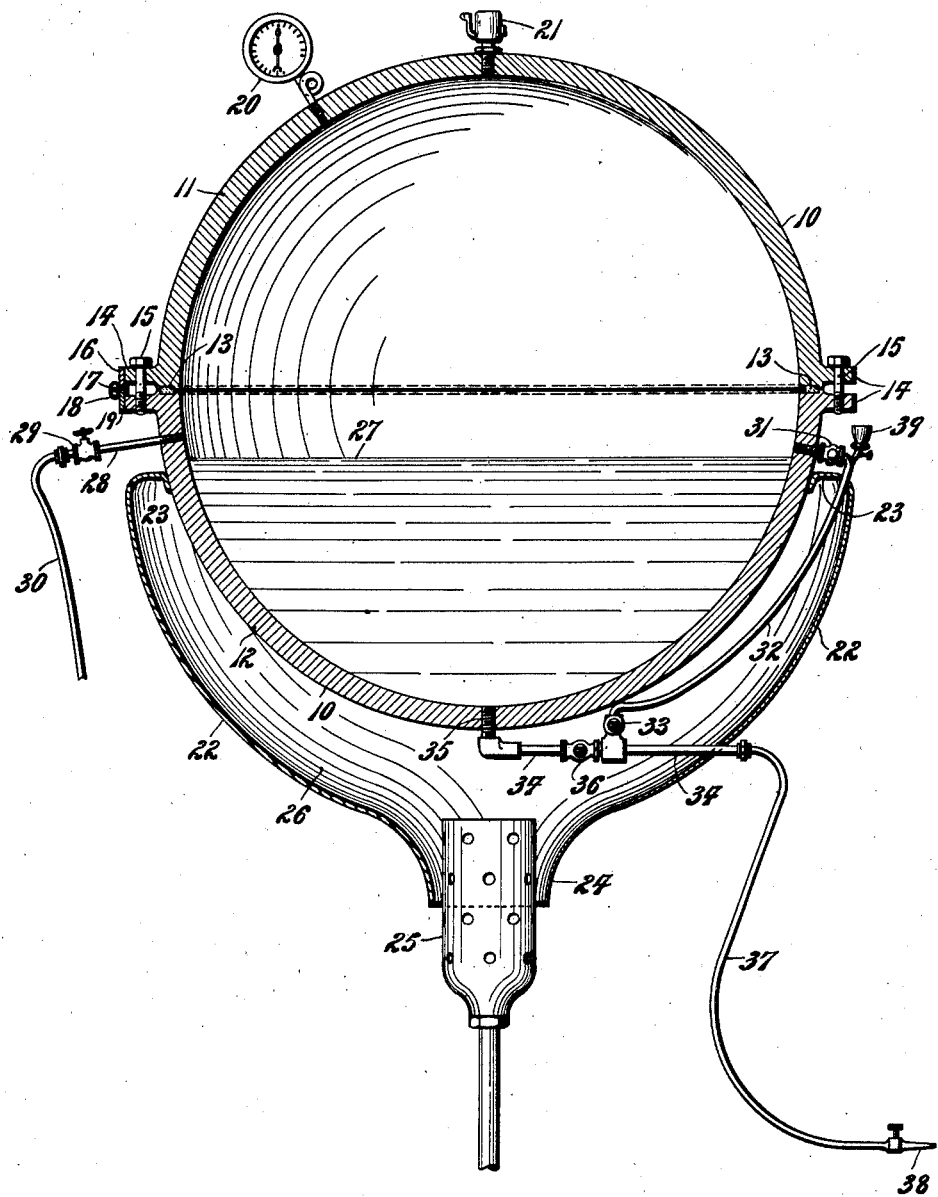
WITNESS:
Alfred T. Bratton
Archibald Shannon
INVENTOR.
BY
Victor J. Evans
ATTORNEY.

UNITED STATES PATENT OFFICE.

ARCHIBALD SHANNON, OF PHILADELPHIA, PENNSYLVANIA, ASSIGNOR OF ONE-THIRD TO AUBREY E. SHANNON, OF PHILADELPHIA, PENNSYLVANIA.

APPARATUS FOR MAKING COATINGS OF LIQUID OR ATOMIZED SUBSTANCES.

1,357,908.  Specification of Letters Patent.  Patented Nov. 2, 1920.

Application filed September 23, 1919. Serial No. 325,716.

*To all whom it may concern:*

Be it known that I, ARCHIBALD SHANNON, a citizen of the United States, residing at Philadelphia, in the county of Philadelphia and State of Pennsylvania, have invented new and useful Improvements in Apparatus for Making Coatings of Liquid or Atomized Substances, of which the following is a specification.

This invention relates to apparatus for making coatings of liquid or atomized substances and it has for its main object to provide a portable apparatus which may be used for galvanizing or plating objects or for soldering objects together.

Another object of this invention is to provide an apparatus of the kind referred to which is fitted with a means for preventing the liquid or atomized substance from clogging or coating the conduit from the melting container to the spraying nozzle.

A further object of this invention is to provide an apparatus of the nature referred to by the use of which far better results are attained than has heretofore been possible.

A still further object is to provide an apparatus whereby a denser layer of the liquid or atomized substance may be coated on and adhered to the foundation, inasmuch as said substance is caused to penetrate into the pores and finest crevices of the article coated.

With these and other objects in view which will be more apparent as the description proceeds, my invention consists essentially in the features of construction, combination and arrangement of parts hereinafter fully described and more specifically defined by the appended claims.

In the further disclosure of the invention reference is to be had to the accompanying drawing, constituting a part of this specification, and which illustrates in vertical section a convenient embodiment of my improved apparatus for making coatings of liquid or atomized substance.

Referring to the drawing the numeral 10, designates in its entirety a spherical container or vessel for the substance to be liquefied or atomized for coating on a foundation or article, and it includes upper and lower hemispherical sections 11, 12 respectively. These sections 11, 12 are provided with an asbestos jointing gasket or ring 13, and each section is formed with laterally projecting opposed ears or lugs 14, 14, adapted to be connected together by set screws or bolts 15, whereby an air-tight joint can be insured. Attached to one pair of the ears or lugs 14, is one leaf 16, of a hinge,—the hinge pin 17, whereof can ride vertically in the elongated bearings 18, of the other leaf 19, whereby provision is made for insuring a tight joint all around the meeting faces of the sections 11, 12.

Secured in the upper sections 11, is a pressure gage 20, and also a "pop" or escape valve 21, and a temperature gage—not shown.

Concentric with the lower section 12, is a sheet metal or other appropriate housing or shield 22, the upper edge whereof is laterally and inwardly flanged at 23, to constitute a seat for said lower section 12; and the lower part of this housing or shield is fashioned to constitute a depending neck portion 24, into which may be inserted the nozzle portion 25, of a gasolene torch—not shown. It is to be here noted that the housing or shield 22, constitutes with the outer surface of the section 12, a flame and heat retaining chamber 26.

Appropriately threaded into the lower section 12, above the normal level of the liquefied or atomized substance—indicated by the numeral 27—is a pipe 28, connected to a control valve 29 which in turn has attached thereto a flexible connection 30 from an air pump—not shown—or other convenient source of air pressure. Remote from the above described air connections is secured a second or outlet air valve 31, united by a pipe 32, to a second air-control valve 33, located in the liquid or atomized substance discharge pipe 34, which connects with the underside of the section 12, at 35, a control valve 36, being arranged at a convenient position in said discharge pipe to regulate the quantity of substance emitted.

A flexible metal hose 37, is attached to the discharge pipe 34, and is provided at its free end with a valve controlled spraying nozzle 38, and said hose 36, is preferably covered with asbestos and mineral wool to effectively retain the heat and prevent its wasteful radiation.

It is to be particularly noted that the pipe 32, serves in use to supply highly superheated air from the container 10, to the discharge pipe 34, and metal hose 37, whereby the clogging or coating of said pipe and hose with the liquefied or atomized substance is effectively prevented, especially when moving the apparatus from place to place.

A pet-cock or feed valve 39, is fitted into the upper end of the pipe 32, for the supplying of oil or some other suitable lubricating vehicle to the discharge mechanism.

The operation of my improved apparatus for liquefying or atomizing substances and spraying same on to metallic surfaces and other articles or objects will be apparent to those skilled in the art to which it appertains without further description, and while I have specifically described one convenient form thereof it is to be clearly understood that various changes may be made in the general arrangement thereof without in any way departing from the essential features, such changes and other combinations being limited by the scope of the appended claims.

Having described my invention, what I claim is:—

1. An apparatus for making coatings of liquid or atomized substances comprising a container for the substance to be liquefied or atomized, means for supplying to and concentrating heat on said container, means for supplying air to the container for heating and expanding the same to eject the liquefied or atomized substance, and means for increasing the temperature of a part of the heated air during its passage from the container to a point adjacent the outlet of the liquefied or atomized substance and injecting same into the discharge conduits to prevent clogging of the liquefied or atomized substance.

2. An apparatus for making coatings of liquid or atomized substances comprising a container for the substance to be liquefied or atomized, means for supplying to and concentrating heat on said container, means for supplying air to the container for heating and expanding the same to eject the liquefied or atomized substance, means for increasing the temperature of a part of the heated air during its passage from the container to a point adjacent the outlet of the liquefied or atomized substance and injecting same into the discharge conduits, and means for spraying the mixture on to the article to be coated.

3. An apparatus for making coatings of liquid or atomized substances comprising a container including hemispherical sections having an airtight connection, a heat retaining chamber substantially surrounding one hemispherical section, means for controlling and supplying air to the container for heating and expanding the same to eject the liquefied or atomized substance, means for controlling the discharge of a part of said heated air and increasing the temperature of same in the heat retaining chamber, means for controlling the supply of and injecting the higher heated air into the discharge conduit at a point adjacent the outlet of the liquefied or atomized substance from the container, and valve controlled means for spraying the mixture on to the article to be coated.

In testimony whereof I, affix my signature.

ARCHIBALD SHANNON.